(12) United States Patent
Vielma

(10) Patent No.: US 10,968,114 B2
(45) Date of Patent: *Apr. 6, 2021

(54) WATER RECYCLING SYSTEM AND METHOD

(71) Applicant: Marcos Vielma, San Jose, CA (US)

(72) Inventor: Marcos Vielma, San Jose, CA (US)

(*) Notice: Subject to any disclaimer, the term of this patent is extended or adjusted under 35 U.S.C. 154(b) by 413 days.

This patent is subject to a terminal disclaimer.

(21) Appl. No.: 16/004,032

(22) Filed: Jun. 8, 2018

(65) Prior Publication Data

US 2018/0354811 A1    Dec. 13, 2018

Related U.S. Application Data

(60) Provisional application No. 62/677,732, filed on May 30, 2018, provisional application No. 62/518,713, filed on Jun. 13, 2017.

(51) Int. Cl.
| | | |
|---|---|---|
| *C02F 1/00* | (2006.01) | |
| *C02F 1/44* | (2006.01) | |
| *C02F 1/28* | (2006.01) | |
| *C02F 1/02* | (2006.01) | |
| *B01D 39/16* | (2006.01) | |
| *C02F 103/00* | (2006.01) | |
| *C02F 101/00* | (2006.01) | |

(52) U.S. Cl.
CPC ............. *C02F 1/008* (2013.01); *B01D 39/16* (2013.01); *C02F 1/001* (2013.01); *C02F 1/02* (2013.01); *C02F 1/281* (2013.01); *C02F 1/283* (2013.01); *C02F 1/44* (2013.01); *C02F 2101/006* (2013.01); *C02F 2103/002* (2013.01); *C02F 2209/006* (2013.01); *C02F 2209/02* (2013.01); *C02F 2209/36* (2013.01); *C02F 2209/40* (2013.01); *C02F 2209/42* (2013.01); *C02F 2301/043* (2013.01); *C02F 2303/04* (2013.01)

(58) Field of Classification Search
CPC .. C02F 1/008; C02F 1/001; C02F 1/02; C02F 1/281; C02F 1/283; C02F 1/44; C02F 1/00; C02F 1/28; C02F 2101/006; C02F 2103/002; C02F 2209/006; C02F 2209/02; C02F 2209/36; C02F 2209/40; C02F 2209/42; C02F 2209/00; C02F 2301/043; C02F 2303/04; B01D 39/16
USPC ........................................................ 210/739
See application file for complete search history.

(56) References Cited

U.S. PATENT DOCUMENTS

| | | |
|---|---|---|
| 4,162,218 A | 7/1979 | McCormick |
| 5,406,657 A | 4/1995 | Donati |

(Continued)

*Primary Examiner* — Robert Clemente
*Assistant Examiner* — Akash K Varma
(74) *Attorney, Agent, or Firm* — Stephen E. Zweig

(57) ABSTRACT

A device, system, and processor-readable medium for untreated grey water treatment and reuse are disclosed. Untreated grey water entering a building's plumbing system is tested for recyclability before it routes for treatment and reuse or disposal through a building's sewer line. Certain sensors decide how to route the untreated grey water through treatment in the device. Treatments to untreated grey water could include multi-level filtration and heating/cooling cycles for a prescribed time period to produce treated grey water meeting EPA-approved standards. Once treated, the treated grey water is routed to treated grey water tanks where it is stored for later use in a building's toilets and landscaping.

13 Claims, 5 Drawing Sheets

(56) References Cited

U.S. PATENT DOCUMENTS

| | | | |
|---|---|---|---|
| 6,702,942 B1 | 3/2004 | Nield | |
| 2009/0222981 A1* | 9/2009 | Hartman | F28F 1/22 |
| | | | 4/313 |
| 2010/0300951 A1 | 12/2010 | Vierling et al. | |
| 2011/0083755 A1 | 4/2011 | Dolo Masnou | |
| 2012/0199220 A1 | 8/2012 | Knepp et al. | |
| 2013/0180928 A1* | 7/2013 | Vielma | E03B 1/041 |
| | | | 210/739 |
| 2014/0116929 A1 | 5/2014 | Williamson | |
| 2015/0321128 A1 | 11/2015 | Gross | |
| 2016/0177545 A1 | 6/2016 | Robb et al. | |
| 2017/0088436 A1* | 3/2017 | Espinoza | B01D 61/12 |
| 2017/0145669 A1* | 5/2017 | Klicpera | F28F 1/22 |
| | | | 4/313 |

* cited by examiner

WATER RECYCLING SYSTEM AND METHOD

CROSS-REFERENCE TO PROVISIONAL APPLICATION

This application claims priority under 35 U.S.C. 119(e) to U.S. Provisional Patent Application Ser. No. 62/518,713, entitled "Water Recycling System," which was filed on Jun. 13, 2017, the disclosure of which is incorporated herein by reference in its entirety. This application also claim priority under 35 U.S.C. 119(e) to U.S. Provisional Patent Application Ser. No. 62/677,732, entitled "WATER RECYCLING SYSTEM AND METHOD" which was filed on May 30, 2018, the disclosure of which is incorporated herein by reference in its entirety.

TECHNICAL FIELD

Embodiments are generally related to a water recycling system. Embodiments are additionally related to a method for detecting water impurities. Embodiments also relate to a device for recycling a building's waste water for additional reuse in the building's plumbing.

BACKGROUND

Efficient usage of water resources is essential for conservation of scarce natural resources and reducing financial strain on families and businesses. Water is typically used for showers and baths, faucets, washing machines, toilets, landscaping, and other uses. The average household in the United States utilizes between 700 and 10,000 gallons of water per month depending on the number of people per household and the types of water usage (i.e. landscaping). A large proportion of potentially recyclable and reusable water generated by households and businesses is lost to waste. That portion which is recycled is known as grey water. Currently, recycled grey water is often unpurified and unfiltered for reuse. Untreated grey water poses a health hazard for the people and businesses.

The waste of potentially recyclable grey water also places a financial burden upon households and businesses. Households and buildings that do not efficiently recycle and reuse water incur hundreds of dollars of additional costs per year due to water waste. The average household water bill in the United States ranges from $25 to over $100 per month. Additionally, water waste places strain on scarce water resources. The recent experience of the 2011-2017 California Drought highlights the necessity of efficient reuse of water by businesses and households. The unprecedented drought prompted a number of water usage restrictions in order to conserve limited resources, including a mandatory 25% reduction in water usage by all California residents and businesses in 2015.

Accordingly, the method, system, apparatus, and software program described herein is intended to solve such problems so that grey water is recycled, purified, and safely reused in a building's plumbing instead of being lost to waste.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, an aspect of the disclosed embodiments to provide an improved grey water detection device.

In addition, it is an aspect of the embodiments to provide an improved grey water recycling system.

It is another aspect of the disclosed embodiments to provide a device for reintroducing recycled grey water to the building's water system for reuse.

The aforementioned aspects and other objectives and advantages can now be achieved as described herein. The disclosed system will reduce the use of fresh water by 60% while recycling 40% of the captured water and redirecting its use for watering of landscape and flushing of toilets. It helps reduce carbon and greenhouse gases for a positive impact on climate change. The system will be used to update current plumbing standards. Finally, it will utilize computer and sensor technology in the construction field which contributes to GreenBuild International and qualification for Leed credentials and points.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE DRAWINGS

Figure 1:
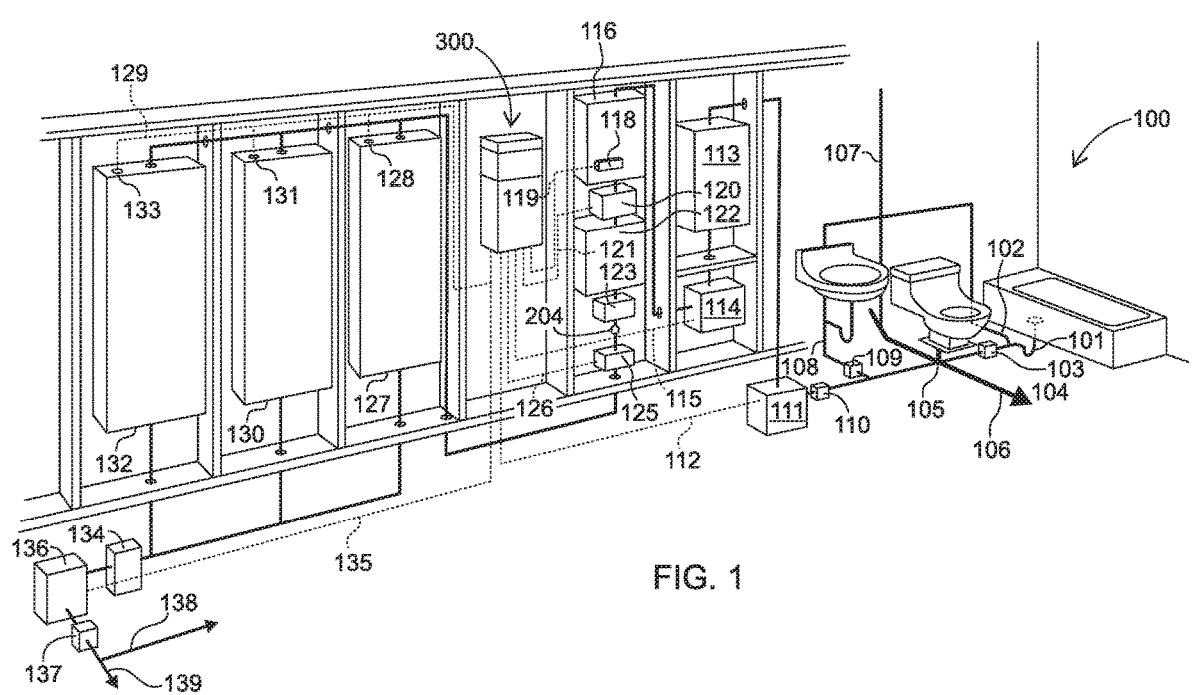
FIG. 1 illustrates a schematic view of a device 100 for detecting, purifying, and recycling untreated grey water for reuse in a building's water system, which can be implemented in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term one or more as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

A device, system, and processor-readable medium for untreated grey water treatment and reuse are disclosed. Untreated grey water entering a building's plumbing system is tested for recyclability before it routes for treatment and reuse or disposal through a building's sewer line. Certain sensors decide how to route the untreated grey water through treatment in the device. Treatments to untreated grey water could include multi-level filtration and heating/cooling cycles for a prescribed time period to produce treated grey water meeting EPA-approved standards. Once treated, the treated grey water is routed to treated grey water tanks where it is stored for later use in a building's toilets and landscaping.

In FIG. 1, a device 100 for treating and recycling untreated grey water is disclosed. The disclosed embodiments describe a device 100 for treating and recycling untreated grey water and recirculating treated grey water for additional use in a building's plumbing and landscaping. The device 100 easily integrates into a system when installed within a building's existing plumbing system. A building can include a home, apartment building, office building, warehouse, etc. Untreated grey water may include the following either alone or in combination: shower water, bathtub water, lavatory water, bathroom sink water, kitchen sink water, etc. Untreated grey water flows through the building's plumbing from plumbing fixtures, such as bathtubs 101, and sinks 108. The first backflow prevention device 102 prevents untreated grey water from flowing backwards into the fixture from which it drained.

A shower sensor 103 detects grey water flowing from the bathtub or shower drain. The first operational sensor 104 detects whether the gray water is contaminated. If first operational sensor 104 detects contamination, directional device 105 allows untreated grey water to flow further into the device. If first operational sensor 104 does not detect contamination or the contamination falls under a certain EPA threshold, then directional device 105 does not allow untreated grey water to continue flowing further into the device and instead directs the untreated grey water out of the device through the building's sewer line 106. Air vent 107, already part of the building's existing plumbing system, allows air to flow through building plumbing to permit water to flow through building plumbing. Sink sensor 109 detects untreated grey water flowing from the sink drain 108. The second operational sensor 110 detects additional contaminants. The water rejected by second operational sensor 110 could then flow back through system to directional valve 105 and out the sewer line 106. First water pump 111, while in communication 112 with data processing system 300 in FIGS. 3-4, pumps untreated grey water into untreated grey water holding tank 113. The size and volume of untreated grey water holding tank 113 may vary depending on the building's square footage and number of occupants.

Figure 2:
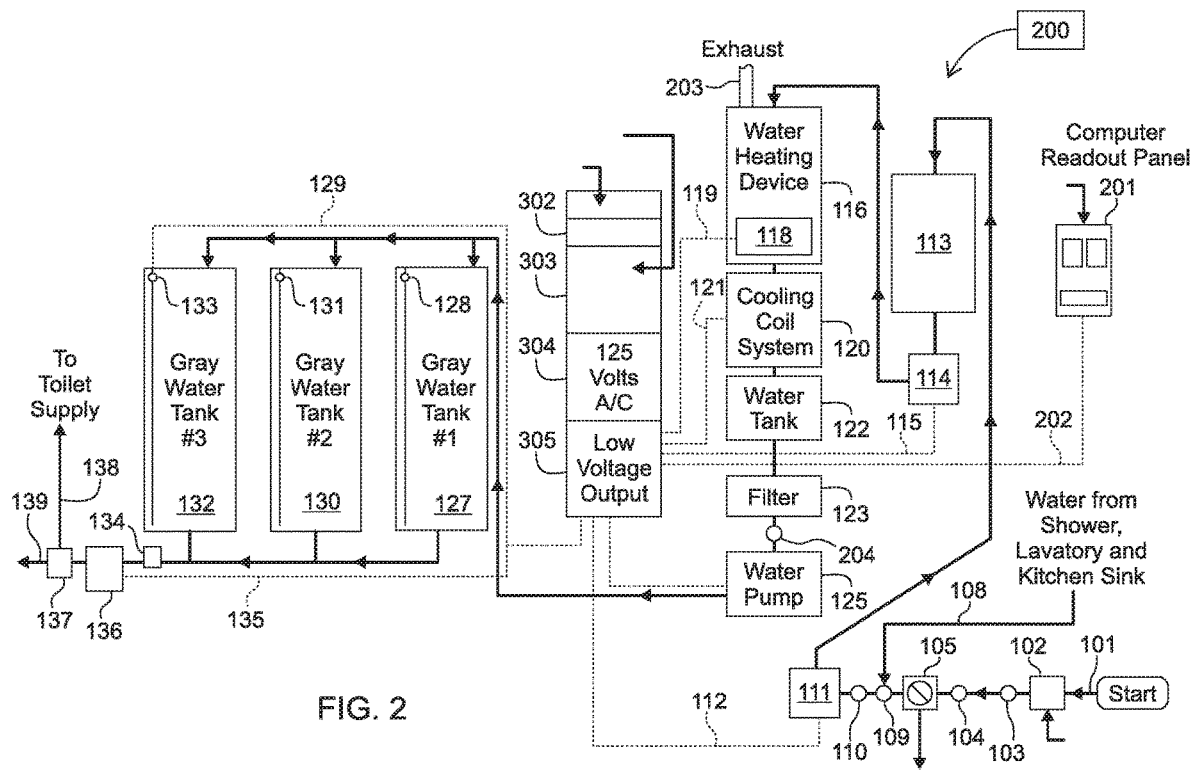
FIG. 2 illustrates a block diagram of a device 100 for detecting, purifying, and recycling untreated grey water for reuse in a building's water system, which can be implemented in accordance with an example embodiment.
Figure 3:
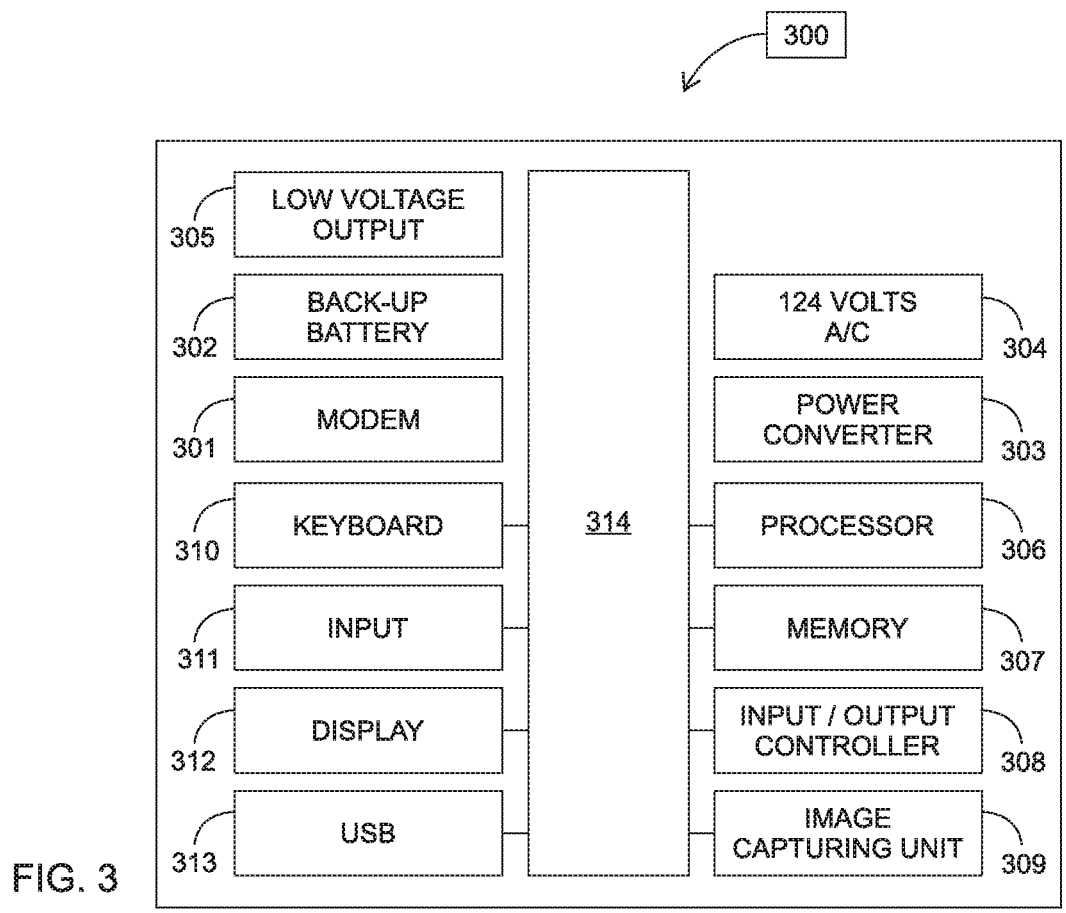
FIG. 3 illustrates a schematic view of a data processing environment 200 for detecting, purifying, and recycling untreated grey water for reuse in a building's water system in accordance with an example embodiment.
Figure 4:
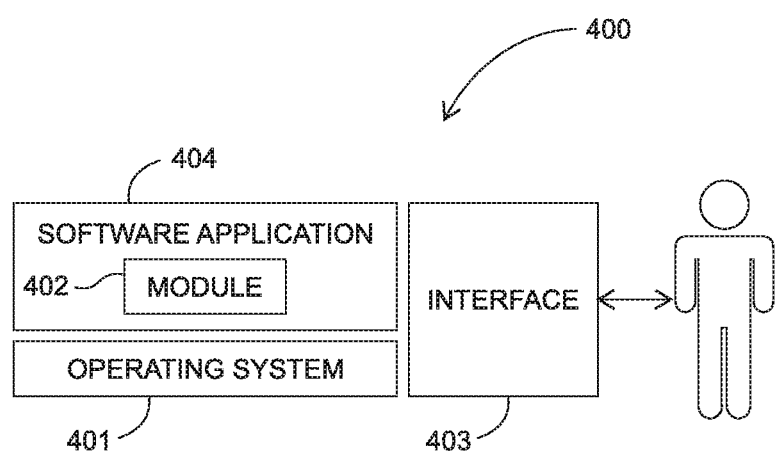
FIG. 4 illustrates a schematic view of a software system 200 including a module, an operating system, and a user interface, in accordance with an example embodiment.

Untreated grey water from untreated grey water holding tank 113 is pumped by second water pump 114, in communication 115 with data processing system 300 in FIGS. 3-4, to water heating device 116. The water heating device 116 will purify the untreated grey water by killing certain types of impurities, including bacteria and viruses. Water heating device 116 utilizes temperature adjustment unit 118, in communication 119 with data processing system 300 in FIGS. 3-4, to determine a preferable temperature from a range of 160° Fahrenheit to 212° Fahrenheit depending on the type of impurity present in the water. Exhaust duct 203 in FIG. 2 vents exhaust gasses and moisture from water heating device 116 into the atmosphere outside of the building. The heated grey water then passes through a cooling coil 120, in communication 121 with data processing system 300 in FIGS. 3-4, to cool to a temperature of 60° Fahrenheit. After heated grey water enters the cooling coil and is cooled to a temperature of 60° Fahrenheit it becomes treated grey water. The treated grey water exits the cooling coil 120 and enters the water tank 122.

Treated grey water in water tank 122 then exits water tank 122 and enters first output filter 123. For example, the first output filter 123 and second output filter 134 can comprise the following filter types: Membrane, Charcoal, Sand, and Polypropylene. First output filter 123 and second output filter 134 can comprise the same type of filters or different filters. The treated grey water then exits first output filter 123 and passes through output sensor 204 in FIG. 2. Output sensor 204 determines whether the treated grey water is free of impurities by comparing the treated grey water composition to Environmental Protection Agency (EPA) purity thresholds. If the treated grey water meets EPA purity standards, then the treated grey water passes into third water pump 125. If the treated grey water does not meet EPA purity standards, then the device shuts down and the treated grey water which does not meet EPA purity standards exits the device through the building's sewer line. In the event of a shutdown due to detected impurities a switch located on computer readout panel 201 in FIG. 2, in communication 202 with data processing system 300 in FIGS. 3-4, will allow a user to bypass the device and return the building's plumbing system to its original functionality. Once the user bypasses the device via the switch located on computer readout panel 201 in FIG. 2, untreated grey water from the building's plumbing system no longer enters the device from building fixtures such as bathtubs 101 and sinks 108. The untreated grey water instead flows out of the building through the building's sewer line via directional device 105.

In the preferred embodiment, treated grey water flows into third water pump 125 where, in communication 126 with data processing system 300 in FIGS. 3-4, it is pumped into first treated grey water tank 127. First volume sensor 128 attached to first treated grey water tank 127, in communication 129 with data processing system 300 in FIGS. 3-4, detects the level of treated grey water in first treated grey water tank 127. When the level of treated grey water in first treated grey water tank 127 reaches first treated grey water tank's 127 maximum capacity, additional treated grey water then flows into second treated grey water tank 130. Second volume sensor 131 attached to second treated grey water tank 130, in communication 129 with data processing system 300 in FIGS. 3-4, detects the level of treated grey water in second treated grey water tank 130. When the level of treated grey water in second treated grey water tank 130 reaches second treated grey water tank's 130 maximum capacity, additional treated grey water then flows into third treated grey water tank 132. Third volume sensor 133 attached to third treated grey water tank 132, in communication 129 with data processing system 300 in FIGS. 3-4, detects the level of treated grey water in third treated grey water tank 132.

In another embodiment, treated grey water flows into third water pump 125 where, in communication 126 with data processing system 300 in FIGS. 3-4, it is pumped into first treated grey water tank 127, second treated grey water tank 130, and third treated grey water tank 132. Treated grey water from third water pump 125 is pumped in equal amounts to first treated grey water tank 127, second treated grey water tank 130, and third treated grey water tank 132. First volume sensor 128 attached to first treated grey water tank 127, second volume sensor 131 attached to second treated grey water tank 130, and third volume sensor 133 attached to third treated grey water tank 132 work simultaneously in communication 129 with data processing system 300 in FIGS. 3-4 to ensure that each treated grey water tank fills with treated grey water at an equal level.

In another embodiment, treated grey water flows into third water pump 125 where, in communication 125 with data processing system 300 in FIGS. 3-4 and in communication 202 with computer readout panel 201 in FIG. 2, a user selects on computer readout panel 201 in FIG. 2 which treated grey water tank treated grey water from third water pump 125 will be pumped into. For example, if the user selects the second treated grey water tank 130 on the computer readout panel 201 in FIG. 2, treated grey water from third water pump 125, in communication 126 with data processing system 300 in FIGS. 3-4 and in communication 201 with computer readout panel 201 in FIG. 2, will be pumped into second treated grey water tank 130. In this example, second volume sensor 131 attached to second treated grey water tank 130, in communication 129 with data processing system 300 in FIGS. 3-4, will detect the level of treated grey water within second treated grey water tank 130 and display the level of treated grey water in second treated grey water tank 130 on computer readout panel 201 in FIG. 2. In this example once the second volume sensor 131, in communication 129 with data processing system 300 in FIGS. 3-4, detects that second treated grey water tank 130 has reached its maximum capacity, the user is prompted to choose the next treated grey water tank to fill with treated grey water from third water pump 125 on computer readout panel 201 in FIG. 2.

Treated grey water held in any of the three treated grey water tanks then flows from the treated grey water tank into second output filter 134 for additional filtration. For example, the second output filter 134 can comprise the following filter types: Membrane, Charcoal, Sand, and Polypropylene. Treated grey water then flows from second output filter 134 to first water pressure pump 136. First water pressure pump 136, in communication 135 with data processing system 300 in FIGS. 3-4, applies pressure to the treated grey water flow and ensures constant water pressure through the device and throughout the building's plumbing system. Treated grey water then is pumped through first water pressure pump 136 at sufficient pressure to either building plumbing 138 supplying toilets with flushable water or building plumbing 139 supplying landscaping with treated grey water. Second backflow device 137 prevents contaminated water from the building plumbing 138 supplying toilets and building plumbing 139 supplying landscaping from flowing back into the device.

Computer readout panel 201 in FIG. 2 monitors the device in communication 201 with data processing system 300 in FIGS. 3-4. Computer readout panel 201 may comprise a novel piece of hardware with a graphical user interface, or an existing computer system as a data processing device 300, as described in FIGS. 3-4 herein. The novel hardware can comprise a computer/mobile system, fully-described in FIGS. 3-4, installed into wall of the building to monitor grey water treatment levels and the capacity of first treated grey water tank 127, second treated grey water tank 130, and third treated grey storage tank 132 in the device 100. Computer readout panel 201 integrates with the data processing system 300 to send automatic or manual messages to a user, about the detected untreated grey water impurities and the status of first treated grey water tank 127, second treated grey water tank 130, and third treated grey storage tank 132. In another embodiment, building occupant or device user can select from computer readout panel 201 which treated grey water tank device 100 should utilize, as described in FIG. 2.

FIGS. 3-4 are provided as exemplary diagrams of data-processing environments in which embodiments may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments As illustrated in FIG. 3, some embodiments may be implemented in the context of a data-processing system 300 that can include one or more processors such as processor 306, a memory 307, a controller 308 (e.g., an input/output controller), a low voltage output 305, a backup battery 302, a modem 301, a 125 Volt A.C. 304, a power converter 303, a peripheral USB (Universal Serial Bus) connection 313, a keyboard 310 (e.g., a physical keyboard or a touch screen graphically displayed keyboard), an input component 311 (e.g., a pointing device, such as a mouse, track ball, pen device, which may be utilized in association or with the keyboard 205, etc.), a display 312, and in some cases, an image-capturing unit 309 (e.g., a digital video camera, an ALPR camera, etc.). Data-processing system 300 may be, for example, a client computing device (e.g., a client PC, laptop, tablet computing device, etc.), which communicates with peripheral devices (not shown) via a client-server network (e.g., wireless and/or wired). In another embodiment, the data-processing system may be a server in the context of a client-server network or other server-based network implementation As illustrated, the various components of data-processing system 300 can communicate electronically through a system bus 314 or other similar architecture. The system bus 314 may be, for example, a subsystem that transfers data between, for example, computer components within data-processing system 300 or to and from other data-processing devices, components, computers, etc. Data-processing system 300 may be implemented as, for example, a server in a client-server based network (e.g., the Internet) or can be implemented in the context of a client and a server (i.e., where aspects are practiced on the client and the server). Data-processing system 300 may be, for example, a stand-alone desktop computer, a laptop computer, a Smartphone, a pad computing device, a server, and so on.

FIG. 4 illustrates a computer software system 400 for directing the operation of the data-processing system 300 shown in FIG. 3. Software application 404, stored for example in memory 202, generally includes a kernel or operating system 401 and a shell or interface 403. One or more application programs, such as software application 404, may be "loaded" (i.e., transferred from, for example, memory 202 or another memory location) for execution by the data-processing system 300. The data-processing system 300 can receive user commands and computer readout 201; these inputs may then be acted upon by the data-processing system 300 in accordance with instructions from operating system 401 and/or software application 404. The interface 403, in some embodiments, can serve to display results, whereupon a user may supply additional inputs or terminate a session The software application 404 can include one or more modules such as, for example, a module 402 (or a module composed of a group of modules), which can, for example, implement instructions or operations such as those described herein. Examples of instructions that can be implemented by module 402 include steps or operations such as those shown and described herein with respect to the various blocks and operations shown in FIGS. 1-2 and described elsewhere herein. Module 402 can include sub-modules such as, for example, the various modules shown in FIG. 5.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" such as module 402 shown in FIG. 4 constitutes a software application. However, a module may also be composed of, for example, electronic and/or computer hardware or such hardware in combination with software. In some cases, a "module" can also constitute a database and/or electronic hardware and software that interact with such a database. For example, the operational sensor module 504 shown in FIG. 5 may include or direct the operations of the first operational sensor 104 and second operational sensor 110 depicted in FIGS. 1-2.

Generally, program modules include, but are not limited to, routines, subroutines, software, applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those shown in FIGS. 1-2, for example, and discussed elsewhere herein can be implemented in the context of such a module or modules, sub-modules, and so on. Examples of such modules are also shown in FIG. 5.

FIGS. 3-4 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Figure 5:
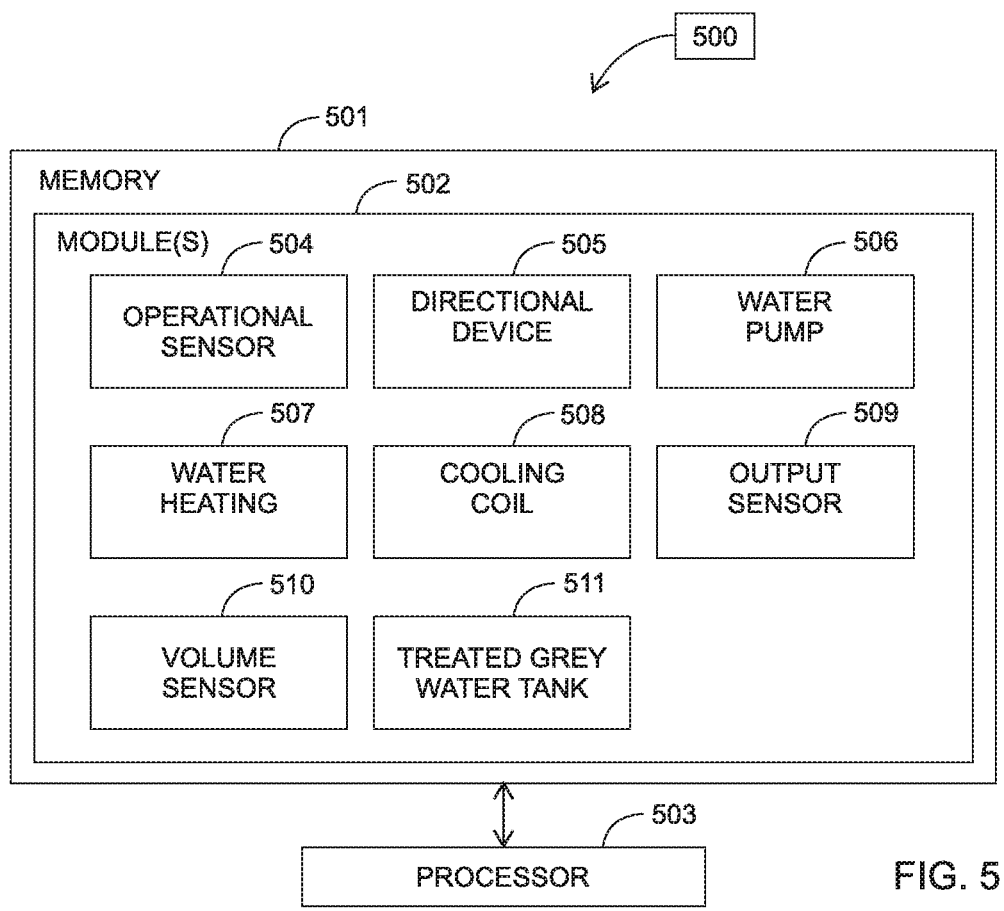
FIG. 5 illustrates a block diagram of computer-implemented modules 400 for the detection and diversion of untreated grey water containing impurities, and the utilization of treated grey water tanks, in accordance with the example embodiment.

FIG. 5 illustrates a block diagram of computer-implemented modules in a system 500 for the detection and diversion of water containing impurities, in accordance with an example embodiment. The system 500 shown in FIG. 5 includes a memory 501 that communicates bidirectionally and electronically with a processor 503. The memory 501 stores a module 502 (or a group of modules) composed of, for example, an operational sensor module 504, a directional device module 505, a water pump module 506, a water heating module 507, a cooling coil module 508, an output sensor module 509, a volume sensor module 510, and a treated grey water tank module 511.

Note that such modules include instructions that implement the various operational steps discussed herein with respect to the device and system shown in FIG. 1. For example, the operational sensor module 504 depicted in FIG. 5 implements the instructions associated with the first operational sensor 104 and second operational sensor 110 in FIGS. 1-2; the directional device module 505 depicted in FIG. 5 implements the instructions associated with directional device 105 in FIGS. 1-2; the water pump module 506 in FIG. 5 implements the instructions associated with the first water pump 111, second water pump 114, third water pump 125, and the water pressure pump 136 in FIGS. 1-2; the water heating module 507 in FIG. 5 implements the instructions associated with the water heating device 116 and temperature adjustment device 118 in FIGS. 1-2; the cooling coil module 508 in FIG. 5 implements the instructions associated with the cooling coil system 120 in FIGS. 1-2; the output sensor module 509 in FIG. 5 implements the instructions associated with output sensor 204 in FIG. 2; the volume sensor module 510 in FIG. 5 implements instructions associated with first volume sensor 128, second volume sensor 131, and third volume sensor 133 in FIGS. 1-2; the treated grey water tank module 511 in FIG. 5 implements instructions associated with first treated grey water tank 127, second treated grey water tank 130, and third treated grey water tank 132 in FIGS. 1-2.

The operational sensor module 504 thus includes instructions for sensing untreated grey water entering the building's plumbing system for impurities. The directional device module 505 includes instructions for passing treatable grey water further into the system for purification based on an acceptable threshold of impurities in the water. Automatic updates of thresholds can also be programmed into operational sensor module 504, directional device module 505, output sensor module 509, or manually entered by a user of the device 100. The water pump module 506 includes instructions for pumping untreated and treated grey water through the system for purification, storage, and reintroduction to the building's plumbing. The water heating module 507 includes instructions for heating the water to a preferred temperature range from 160° Fahrenheit to 212® Fahrenheit for a certain time period. The cooling coil module 508 contains instructions for cooling the water to a particular temperature after it passed through the water heating device 116.

The output sensor module 509 contains instructions for allowing the treated grey water to flow into the first treated grey water tank 127, second treated grey water tank 130, and third treated grey water tank 132 or to shut down the device if the treated grey water still contains impurities. Output sensor module 509 also contains instructions for enabling a user to bypass the device in the event of a shutdown due to detected impurities, thus returning the building's plumbing system to its original function and diverting all further untreated grey water from bathtub fixtures 101 and sink fixtures 108 out through the building's sewer line via directional device 105. The volume sensor module 510 includes instructions for monitoring the level of treated grey water in the first treated grey water tank 127, second treated grey water tank 130, and third treated grey water tank 132. The treated grey water tank module includes instructions for how treated grey water is divided up between the three treated grey water tanks. In the preferred embodiment, treated grey water fills the treated grey water tanks in sequence. In another embodiment treated grey water is distributed to each treated grey water tank simultaneously so each treated grey water tank maintains an identical volume of treated grey water. In another embodiment the user of device 100 can manually choose which treated grey water tank is to be filled.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wimax, IEEE 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Based on the foregoing, it can be appreciated that a number of embodiments, preferred and alternative, are disclosed herein. The techniques/embodiments described herein are in no way meant to limit the breadth of potential applications. For example, in one embodiment a device for detecting untreated grey water quality is disclosed. The device comprises: a first operational sensor that detects an impurity in untreated grey water, wherein the untreated grey water flows through a plumbing system of a building; a second operational sensor that detects the impurity in the untreated grey water, wherein the untreated grey water flows through the plumbing system of the building; a directional device associated with a first operational sensor and a second operational sensor, wherein the directional device routes the untreated grey water into a water heating device and a first output filter, wherein the untreated grey water passes through the first output filter as an output of treated grey water; and an output sensor associated with the first operational sensor, the second operational sensor, and the directional device, wherein the output sensor routes the treated grey water to a plurality of treated grey water tanks for storage prior to reuse in the plumbing system of the building if the treated grey water contains an impurity at or below a threshold for an acceptable impurity level, wherein the output sensor routes treated grey water to a sewer line through the plumbing system of the building if the treated grey water contains an impurity above the threshold for an acceptable impurity level, or wherein the output sensor shuts down the device if the treated grey water contains an impurity above the threshold for an acceptable impurity level. There are several applications and methods that will be determined during the research and development phase in conjunction with EPA Standards.

In another embodiment, the device further comprises a shower sensor that detects the untreated grey water entering the plumbing system of the building via a bathtub or shower in the building; and a sink sensor that detects untreated grey water entering the plumbing system of the building via a sink in the building. In yet another embodiment, the device includes: a first water pump that pumps the untreated grey water into an untreated grey water holding tank; a second water pump that pumps the untreated grey water from the untreated grey water holding tank through the water heating device, a cooling coil, and the first output filter; a third water pump that pumps the treated grey water from the first output filter to the plurality of treated grey water tanks; and a water pressure pump that pumps the treated grey water from the plurality of treated grey water tanks to the plumbing system of the building.

In some example embodiments the untreated grey water holding tank stores the untreated grey water from the plumbing system of the building until the untreated grey water can be purified; and the plurality of grey water tanks comprises a first treated grey water tank, a second treated grey water tank, and a third grey water tank, wherein the plurality of treated grey water tanks are connected to the third water pump which pumps treated grey water from the first output filter to the first treated grey water tank, then the second treated grey water tank, and then the third treated grey water tank; the first operational sensor is positioned to detect an impurity in untreated grey water draining from a bathtub or shower connected to the plumbing system of a building; the second operational sensor is positioned to detect an impurity in untreated grey water draining from a sink connected to the plumbing system of the building; and the directional device associated with the first operational sensor and the second operational sensor routes untreated grey water which contains an impurity to a sewer line connected to the plumbing system of the building.

In yet another embodiment, the device further comprises a first backflow prevention device that prevents untreated grey water from flowing backwards out of the system and into the plumbing of the building; a second backflow prevention device that prevents untreated grey water from flowing backwards through the plumbing of the building and into the system; a temperature adjustment unit that controls temperature of the water heating device wherein the temperature adjustment unit sends a signal to a computer panel wherein the computer panel is integrated into a data processing system; a cooling coil that cools the grey water after the grey water passes through the heating device, wherein the treated grey water is cooled for an appropriate amount of time to a preferred temperature range of 60° Fahrenheit, wherein the first output filter filters impurities from the treated grey water after the treated grey water exits the cooling coil, wherein the first filter comprises a membrane filter, a charcoal filter, a sand filter, or a polypropylene filter; and a water tank that stores cooled grey water after the cooled grey water exits a cooling coil and before the cooled grey water enters the first output filter.

In an example embodiment, the water heating device heats the untreated grey water to a preferred temperature range of 160° Fahrenheit to 212° Fahrenheit, wherein the untreated grey water is heated for an appropriate amount of time to kill impurities in the untreated grey water.

In an alternative embodiment, the device further comprises a first volume sensor which detects the amount of treated grey water within the first treated grey water tank; a second volume sensor which detects the amount of treated grey water within the second treated grey water tank; and a third volume sensor which detects the amount of treated grey water within the third treated grey water tank. In another embodiment, the device further comprises a second output filter which filters impurities from the treated grey water after the treated grey water exits one of the plurality of treated grey water tanks, wherein the second filter comprises a membrane filter, a charcoal filter, a sand filter, or a polypropylene filter.

In another embodiment, a method for detecting untreated grey water quality is disclosed. Such a method may include the steps of: detecting untreated grey water entering a plumbing system of a building; detecting an impurity in the untreated grey water via a first operational sensor, wherein the impurity comprises bacteria, viruses, chemicals, toxins, fertilizers, minerals, biological weapons, radioactive materials, or radioactive waste; detecting the impurity in the untreated grey water via a second operational sensor; routing the untreated grey water into a water heating device and a first output filter via a directional device, wherein the untreated grey water passes through the first output filter as an output of treated grey water, wherein the directional device is associated with the first operational sensor and the second operational sensor; routing the treated grey water via the output sensor to a plurality of treated grey water tanks for storage and reuse in the plumbing system of the building if the treated grey water contains an impurity at or below the threshold for an acceptable impurity level; routing the treated gray water via the output sensor to the sewer line through the plumbing system of the building if the treated grey water contains an impurity above the threshold for an acceptable impurity level; and shutting down the device via the output sensor if the treated grey water contains an impurity above the threshold for an acceptable impurity level.

In yet another embodiment, the method can further comprise the steps of: preventing untreated grey water from re-entering the plumbing system of a building from the device via a first backflow prevention device and a second backflow prevention device; pumping untreated grey water from the plumbing system of a building via the first water pump into the untreated grey water holding tank; pumping untreated grey water from the untreated grey water holding tank via the second water pump through a water heating device, a cooling coil, and the first output filter; pumping the treated grey water tank from the first output filter to the plurality of treated grey water tanks via a third water pump, then pumping the treated grey water from the plurality of treated grey water tanks into the plumbing system of a building via the water pressure pump, wherein the plurality of treated grey water tanks comprises a first treated grey water tank, a second treated grey water tank, and a third grey water tank, wherein the plurality of treated grey water tanks are connected to the third water pump which pumps treated grey water from the first output filter to the first treated grey water tank, then the second treated grey water tank, and then the third treated grey water tank; and the plurality of treated grey water tank sensors are in communication with the computer panel, wherein the computer panel is in communication with the data processing system.

In an alternate embodiment, the method can further comprise the steps of: sensing the level of treated grey water in the first treated grey water tank via the first treated grey water tank volume sensor; sensing the level of treated grey water in the second treated grey water tank via the second treated grey water tank volume sensor; sensing the level of treated grey water in a third treated grey water tank via the third treated grey water tank volume sensor; detecting untreated grey water entering the plumbing system of a building from a shower or bathtub in the building via the shower sensor, wherein the untreated grey water draining from the bathtub or shower connected to the plumbing system of the building is sensed for impurity via the second operational sensor; detecting untreated grey water entering the plumbing system of a building from a sink in the building via the sink sensor, wherein the untreated grey water draining from the sink connected to the plumbing system of the building is sensed for impurity via the first operational sensor.

In an example embodiment, the method can further comprise the steps of controlling a temperature of the water heating device via a temperature adjustment unit, wherein the temperature adjustment unit sends a signal to a computer panel, wherein the computer panel is integrated into a data processing system; cooling the treated grey water after the untreated grey water passes through the heating device, wherein the grey water is cooled for an appropriate amount of time to a preferred temperature range of 60° Fahrenheit, wherein the untreated grey water is heated via the water heating device to a preferred temperature range of 160° Fahrenheit to 212° Fahrenheit, wherein the water is heated for an appropriate amount of time to kill impurities in the untreated grey water, wherein the first output filter filters impurities from the treated grey water after the treated grey water exits the cooling coil, wherein the first filter comprises a membrane filter, a charcoal filter, a sand filter, or a polypropylene filter; and storing the cooled grey water via a water tank after the cooled grey water exits the cooling coil and before the cooled grey water enters the first output filter. In yet another embodiment, the method can further comprise the steps of selecting on the computer panel which of the plurality of treated grey water tanks is to be filled with treated grey water; selecting on the computer panel that the plurality of treated grey water tanks be filled in sequence with treated grey water, wherein the first treated grey water tank is filled to capacity with treated grey water, thereafter the second treated grey water tank is filled to capacity with treated grey water, thereafter the third treated grey water tank is filled to capacity with treated grey water; selecting on the computer panel that the plurality of treated grey water tanks will be filled equally until the first treated grey water tank, the second treated grey water tank, and the third treated grey water tank reach capacity at the same time; and selecting on the computer panel a switch that will bypass the device and return the plumbing system of the building to its original functionality.

In an alternate embodiment, the method can further comprise the steps of: filtering an impurity from treated grey water via the second output filter after the treated grey water exits one of the plurality of treated grey water tanks, wherein the second filter comprises a membrane filter, a charcoal filter, a sand filter, or a polypropylene filter.

In an embodiment, a non-transitory processor-readable medium storing computer code representing instructions to cause a process for detecting untreated grey water is disclosed. For example, the instructions comprise code to detect untreated grey water entering a plumbing system of a building; detect an impurity in the untreated grey water via a first operational sensor, wherein the impurity comprises bacteria, viruses, chemicals, toxins, fertilizers, minerals, biological weapons, radioactive materials, or radioactive waste; detect the impurity in the untreated grey water via a second operational sensor; routing the untreated grey water into a water heating device and a first output filter via a directional device, wherein the untreated grey water passes through the first output filter as an output of treated grey water, wherein the directional device is associated with the first operational sensor and the second operational sensor; route the treated grey water via the output sensor to a plurality of treated grey water tanks for storage and reuse in the plumbing system of the building if the treated grey water contains an impurity at or below the threshold for an acceptable impurity level; route the treated grey water via the output sensor to the sewer line through the plumbing system of the building if the treated grey water contains an impurity above the threshold for an acceptable impurity level; and shut down the device via the output sensor if the treated grey water contains an impurity above the threshold for an acceptable impurity level.

In yet another embodiment, the instructions comprise code to prevent untreated grey water from re-entering the plumbing system of a building from the device via a first backflow prevention device and a second backflow prevention device; pump untreated grey water from the plumbing system of a building via the first water pump into the untreated grey water holding tank; pump untreated grey water from the untreated grey water holding tank via the second water pump through a water heating device, a cooling coil, and the first output filter; and pump the treated grey water tank from the first output filter to the plurality of treated grey water tanks via a third water pump, then pumping the treated grey water from the plurality of treated grey water tanks into the plumbing system of a building via the water pressure pump, wherein the plurality of treated grey water tanks comprises a first treated grey water tank, a second treated grey water tank, and a third grey water tank, wherein the plurality of treated grey water tanks are connected to the third water pump which pumps treated grey water from the first output filter to the first treated grey water tank, then the second treated grey water tank, and then the third treated grey water tank.

In another embodiment, the instructions comprise code to sense the level of treated grey water in the first treated grey water tank via the first treated grey water tank volume sensor; sense the level of treated grey water in the second treated grey water tank via the second treated grey water tank volume sensor; sense the level of treated grey water in a third treated grey water tank via the third treated grey water tank volume sensor; detect untreated grey water entering the plumbing system of a building from a shower or bathtub in the building via the shower sensor, wherein the untreated grey water draining from the bathtub or shower connected to the plumbing system of the building is sensed for impurity via the second operational sensor; and detect untreated grey water entering the plumbing system of a building from a sink in the building via the sink sensor, wherein the untreated grey water draining from the sink connected to the plumbing system of the building is sensed for impurity via the first operational sensor.

In an example embodiment, the instructions comprise code to control a temperature of the water heating device via a temperature adjustment unit, wherein the temperature adjustment unit sends a signal to a computer panel, wherein the computer panel is integrated into a data processing system; cool the treated grey water after the untreated grey water passes through the heating device, wherein the grey water is cooled for an appropriate amount of time to a preferred temperature range of 60° Fahrenheit, wherein the untreated grey water is heated via the water heating device to a preferred temperature range of 160° Fahrenheit to 212° Fahrenheit, wherein the water is heated for an appropriate amount of time to kill impurities in the untreated grey water, wherein the first output filter filters impurities from the treated grey water after the treated grey water exits the cooling coil, wherein the first filter comprises a membrane filter, a charcoal filter, a sand filter, or a polypropylene filter;

and store the cooled grey water via a water tank after the cooled grey water exits the cooling coil and before the cooled grey water enters the first output filter.

In yet another embodiment, the instructions comprise code to select one of the plurality of treated grey water tanks to be filled with treated grey water; select the plurality of treated grey water tanks to be filled in sequence with treated grey water, wherein the first treated grey water tank is filled to capacity with treated grey water, thereafter the second treated grey water tank is filled to capacity with treated grey water, thereafter the third treated grey water tank is filled to capacity with treated grey water; select the plurality of treated grey water tanks to be filled equally until the first treated grey water tank, the second treated grey water tank, and the third treated grey water tank reach capacity at the same time; and select to bypass the device and return the plumbing system of the building to its original functionality. In another embodiment, the instructions comprise code to filter an impurity from treated grey water via the second output filter after the treated grey water exits one of the plurality of treated grey water tanks, wherein the second filter comprises a membrane filter, a charcoal filter, a sand filter, or a polypropylene filter.

It will be appreciated that variations of the above-disclosed and other features and functions, or alternatives thereof, may be desirably combined into many other different systems or applications. Also, it can be appreciated that various presently unforeseen or unanticipated alternatives, modifications, variations or improvements therein may be subsequently made by those skilled in the art which are also intended to be encompassed by the following claims.

What is claimed is:

1. A device for detecting untreated grey water quality, the device comprising:
a first operational sensor that detects an impurity in untreated grey water, wherein the untreated grey water flows through a plumbing system of a building;
a second operational sensor that detects the impurity in the untreated grey water, wherein the untreated grey water flows through the plumbing system of the building;
a directional device associated with said first operational sensor and said second operational sensor, wherein the directional device routes the untreated grey water into a water heating device and a first output filter, wherein the untreated grey water passes through the first output filter as an output of treated grey water;
and an output sensor associated with said first operational sensor, said second operational sensor, and the directional device, wherein the output sensor routes the treated grey water to a plurality of treated grey water tanks for storage prior to reuse in the plumbing system of the building if the treated grey water contains an impurity at or below a threshold for an acceptable impurity level, wherein the output sensor routes the treated grey water to a sewer line through the plumbing system of the building if the treated grey water contains an impurity above the threshold for an acceptable impurity level, or wherein the output sensor shuts down the device if the treated grey water contains an impurity above the threshold for an acceptable impurity level;
further comprising a computer panel configured to receive input on which of the plurality of treated grey water tanks is to be filled with the treated grey water;
said computer panel further configured to receive input that the plurality of treated grey water tanks be filled in sequence with the treated grey water, wherein a first treated grey water tank is filled to capacity with the treated grey water, thereafter a second treated grey water tank is filled to capacity with the treated grey water, thereafter a third treated grey water tank is filled to capacity with the treated grey water;
said computer panel further configured to receive input that the plurality of treated grey water tanks will be filled equally until the first treated grey water tank, the second treated grey water tank, and the third treated grey water tank reach capacity at the same time; and
said computer panel further comprising a switch configured to receive input that will bypass the device and return the plumbing system of the building to its original functionality.

2. The device of claim 1 further comprising:
a shower sensor that detects the untreated grey water entering the plumbing system of the building via a bathtub or shower in the building;
a sink sensor that detects the untreated grey water entering the plumbing system of the building via a sink in the building.

3. The device of claim 1 further comprising:
a first water pump that pumps the untreated grey water into an untreated grey water holding tank;
a second water pump that pumps the untreated grey water from the untreated grey water holding tank through the water heating device, a cooling coil, and the first output filter;
a third water pump that pumps the treated grey water from the first output filter to the plurality of treated grey water tanks; and
a water pressure pump that pumps the treated grey water at sufficient water pressure levels from the plurality of treated grey water tanks to the plumbing system of the building.

4. The device of claim 1 wherein:
an untreated grey water holding tank stores the untreated grey water from the plumbing system of the building until the untreated grey water can be purified; and
the plurality of the treated grey water tanks comprises a first treated grey water tank, a second treated grey water tank, and a third treated grey water tank, wherein the plurality of the treated grey water tanks are connected to the third water pump which pumps the treated grey water from the first output filter to the first treated grey water tank, then the second treated grey water tank, and then the third treated grey water tank;
said first operational sensor is positioned to detect a said impurity in the untreated grey water draining from a bathtub or shower connected to the plumbing system of said building;
said second operational sensor is positioned to detect said impurity in the untreated grey water draining from a sink connected to the plumbing system of the building; and
the directional device associated with said first operational sensor and said second operational sensor routes the untreated grey water which contains said impurity to said sewer line connected to the plumbing system of the building.

5. The device of claim 1 further comprising:
a first backflow prevention device that prevents the untreated grey water from flowing backwards out of the system and into the plumbing of the building;
a second backflow prevention device that prevents the untreated grey water from flowing backwards through the plumbing of the building and into the system;

a temperature adjustment unit that controls temperature of the water heating device wherein the temperature adjustment unit sends a signal to a computer panel wherein the computer panel is integrated into a data processing system;

a cooling coil that cools the treated grey water after the untreated grey water passes through the heating device, wherein the treated grey water is cooled for an appropriate amount of time to a preferred temperature of 60° Fahrenheit, wherein the first output filter filters impurities from the treated grey water after the treated grey water exits said cooling coil, wherein the first filter comprises a membrane filter, a charcoal filter, a sand filter, or a polypropylene filter; and a water tank that stores the cooled grey water after the cooled grey water exits said cooling coil and before the cooled grey water enters the first output filter.

6. The device of claim 1 wherein:

the water heating device heats the untreated grey water to a preferred temperature range of 160° Fahrenheit to 212° Fahrenheit, wherein the untreated grey water is heated for an appropriate amount of time to kill impurities in the untreated grey water.

7. The device of claim 1 further comprising:

a first volume sensor which detects a first amount of treated grey water within a first treated grey water tank;

a second volume sensor which detects a second amount of treated grey water within a second treated grey water tank; and a third volume sensor which detects a third amount of treated grey water within a third treated grey water tank.

8. The device of claim 1 further comprising a second output filter which filters impurities from the treated grey water after the treated grey water exits one of the plurality of treated grey water tanks, wherein the second filter comprises a membrane filter, a charcoal filter, a sand filter, or a polypropylene filter.

9. A method for detecting untreated grey water quality, the method comprising:

detecting untreated grey water entering a plumbing system of a building;

detecting an impurity in the untreated grey water via a first operational sensor, wherein the impurity comprises bacteria, viruses, chemicals, toxins, fertilizers, minerals, biological weapons, radioactive materials, or radioactive waste;

detecting the impurity in the untreated grey water via a second operational sensor;

routing the untreated grey water into a water heating device and a first output filter via a directional device, wherein the untreated grey water passes through the first output filter as an output of treated grey water, wherein the directional device is associated with said first operational sensor and said second operational sensor;

routing the treated grey water via an output sensor to a plurality of treated grey water tanks for storage and reuse in the plumbing system of the building if the treated grey water contains an impurity at or below a threshold for an acceptable impurity level;

routing the treated grey water via said output sensor to a sewer line through the plumbing system of the building if the treated grey water contains an impurity above said threshold for an acceptable impurity level; and shutting down the device via said output sensor if the treated grey water contains an impurity above said threshold for an acceptable impurity level;

selecting on a computer panel which of the plurality of treated grey water tanks is to be filled with the treated grey water;

selecting on the computer panel that the plurality of treated grey water tanks be filled in sequence with the treated grey water, wherein a first treated grey water tank is filled to capacity with the treated grey water, thereafter a second treated grey water tank is filled to capacity with the treated grey water, thereafter a third treated grey water tank is filled to capacity with the treated grey water;

selecting on the computer panel that the plurality of treated grey water tanks will be filled equally until the first treated grey water tank, the second treated grey water tank, and the third treated grey water tank reach capacity at the same time; and selecting on the computer panel a switch that will bypass the device and return the plumbing system of the building to its original functionality.

10. The method of claim 9 further comprising:

preventing the untreated grey water from re-entering the plumbing system of said building from the device via a first backflow prevention device and a second backflow prevention device;

pumping the untreated grey water from the plumbing system of said building via a first water pump into the untreated grey water holding tank;

pumping the untreated grey water from the untreated grey water holding tank via a second water pump through a said water heating device, a cooling coil, and the first output filter;

pumping the treated grey water from the first output filter to the plurality of treated grey water tanks via a third water pump, then pumping the treated grey water from the plurality of treated grey water tanks into the plumbing system of said building via a water pressure pump, wherein the plurality of treated grey water tanks comprises a first treated grey water tank, a second treated grey water tank, and a third treated grey water tank, wherein the plurality of treated grey water tanks are connected to the third water pump which pumps treated grey water from the first output filter to the first treated grey water tank, then the second treated grey water tank, and then the third treated grey water tank; and a plurality of treated grey water tank sensors are in communication with a computer panel, wherein said computer panel is in communication with a data processing system.

11. The method of claim 9 further comprising:

sensing a first level of treated grey water in a first treated grey water tank via a first treated grey water tank volume sensor;

sensing a second level of treated grey water in a second treated grey water tank via a second treated grey water tank volume sensor;

sensing a third level of treated grey water in a third treated grey water tank via a third treated grey water tank volume sensor;

detecting the untreated grey water entering the plumbing system of said building from a shower or bathtub in the building via a shower sensor, wherein the untreated grey water draining from the bathtub or shower connected to the plumbing system of the building is sensed for impurity via said second operational sensor; and detecting the untreated grey water entering the plumbing system of said building from a sink in the building via a sink sensor, wherein the untreated grey water draining from the sink connected to the plumbing system of the building is sensed for impurity via said first operational sensor.

12. The method of claim 9 further comprising:

controlling a temperature of the water heating device via a temperature adjustment unit, wherein the temperature adjustment unit sends a signal to a computer panel, wherein the computer panel is integrated into a data processing system;

cooling the treated grey water after the untreated grey water passes through the heating device, wherein the treated grey water is cooled for an appropriate amount of time to a preferred temperature of 60° Fahrenheit, wherein the untreated grey water is heated via the water heating device to a preferred temperature range of 160° Fahrenheit to 212° Fahrenheit, wherein the water is heated for an appropriate amount of time to kill impurities in the untreated grey water, wherein the first output filter filters impurities from the treated grey water after the treated grey water exits a cooling coil, wherein the first filter comprises a membrane filter, a charcoal filter, a sand filter, or a polypropylene filter; and storing the cooled grey water via a water tank after the cooled grey water exits said cooling coil and before the cooled grey water enters the first output filter.

13. The method of claim 9 further comprising:

filtering an impurity from the treated grey water via a second output filter after the treated grey water exits one of the plurality of treated grey water tanks, wherein the second filter comprises a membrane filter, a charcoal filter, a sand filter, or a polypropylene filter.

* * * * *